United States Patent Office 2,860,117
Patented Nov. 11, 1958

2,860,117

EPOXY COMPOUNDS AS PLASTICIZERS FOR QUATERNIZED POLYMERS

James E. Pritchard and Peter J. Canterino, Bartlesville, Okla., assignors to Phillips Petroleum Company, a corporation of Delaware No Drawing. Application July 23, 1954
Serial No. 445,456

10 Claims. (Cl. 260—30.4)

This invention relates to epoxy compounds as plasticizers for quaternized polymers. In a further aspect this invention relates to a method for plasticizing quaternized polymers of heterocyclic nitrogen bases containing at least one $CH_2=C<$ group. In a further aspect this invention relates to the use of epoxy compounds having molecular weghts of at least 90 as plasticizers for polymers and copolymers of heterocyclic nitrogen bases containing at least one $CH_2=C<$ group.

Quaternized polymers of heterocyclic nitrogen bases containing at least one $CH_2=C<$ group are disclosed in Pritchard application Serial No. 284,448, filed April 25, 1952, now abandoned. Therein are disclosed the quaternized polymers prepared from liquid and solid polymers of these heterocyclic nitrogen base derivatives. These products are of considerable value in the synthetic rubber and resin field, but one drawback to their more complete utilization has been the difficulty of suitably plasticizing them. A rubber plasticizer should be one which imparts low swelling and extractability to the polymer in which it is used and also gives a product which has high tensile strength and good low temperature properties as well as a good balance of other properties. Frequently when a plasticizer imparts low swelling characteristics and desirable low temperature properties to a polymer it is readily extractable from the rubber upon contact with hydrocarbon materials such as gasoline, kerosene, or the like. On the other hand, a plasticizer which is nonextractable frequently gives a rubber which undergoes considerable swelling when in contact with hydrocarbon solvents and the low temperature properties leave much to be desired.

In spite of the improved properties of the materials disclosed in the above-identified application, certain polymers and copolymers have been subject to these difficulties. We have now found a class of compounds which serve as excellent plasticizers for these polymeric materials, and which provide rubber to resinous materials which have improved resistance to hydrocarbon solvents, high tensile strength, and good low temperature properties.

Each of the following objects is obtained by at least one of the aspects of this invention.

An object of this invention is to provide plasticized quaternized polymers of heterocyclic nitrogen bases containing at least one $CH_2=C<$ group.

A further object of this invention is to provide a method for plasticizing these polymers.

A further object of this invention is to provide polymers of heterocyclic nitrogen bases containing, as a plasticizer, epoxy compounds having molecular weights of at least 90.

A further object of this invention is to provide copolymers of conjugated dienes, such as butadiene, and vinylpyridines such as 2-methyl-5-vinylpyridine, these copolymers containing, as a plasticizer, epoxy compounds having molecular weights of at least 90.

Other objects and advantages of this invention will be apparent to one skilled in the art upon reading the accompanying disclosure.

We have discovered that epoxy compounds are excellent plasticizers for quaternized polymers of heterocyclic nitrogen bases containing at least one vinyl or alpha-methylvinyl group. These heterocyclic nitrogen bases are generally of the pyridine and quinoline series and the polymers range from resinous to rubbery materials. When the quaternized polymers are rubbery materials, the epoxy compound plasticizers give products which have improved swelling and extractability characteristics, high tensile strength and good low temperature properties. This plasticizing effect is temporary or permanent depending upon the polymer.

The epoxy compounds which are applicable are those having a molecular weight of at least 90 and the formula $$X-\underset{X}{C}\overset{O}{\overline{\phantom{XX}}}\underset{X}{C}-X$$

wherein X is a radical which (1) Can be completely hydrocarbon in character including saturated aliphatic, saturated alicyclic, and aromatic radicals,
(2) Can contain ether linkages (C—O—C),
(3) Can contain halogen atoms,
(4) Can contain hydroxy radicals,
(5) Can be hydrogen, or
(6) Can contain any combination of the above radicals.

In addition, the two carbon atoms shown in the formula
(1) Can be part of a carboxyclic ring,
(2) Can be part of a heterocyclic ring containing carbon and oxygen atoms, or
(3) Can be part of an epoxy resin molecule which can also contain one or more of ether linkages, halogen atoms and hydroxy radicals.

The epoxides include those having a molecular weight of at least 90 including as well those of complex structure such as the epoxy resins and can have a molecular weight ranging up to about 10,000 or more. They include materials which are normally liquid and normally solid in character. As examples illustrating the types of compounds which are intended to be included are the following: 1,2-epoxy-2,4,4-trimethylpentane; 1,2-epoxycyclohexane; 1,2-epoxycyclooctane; 1,2-epoxy-4-cyclohexylpentane; 1,2-epoxyoctadecane; 1,2-epoxyeicosane; styrene oxide; 1,2-epoxy-3-chlorophenylpropane; 2,3-epoxy-5-ethoxydecane; 1,2-epoxy-4-chloromethylhexadecane; 1,2-epoxy-4-chlorocyclohexane; epichlorohydrin; epibromohydrin; 1,2-epoxy-4(2-hydroxyethyl)tridecane; and 5,6-epoxy-14-hydroxy-18-chloro-22-ethyltriacontane.

Epoxy compounds containing polymeric chains derived from conjugated dienes or from vinyl or condensation polymerization are also applicable. Examples of one type of epoxy resins which are applicable and which are commercially available are the Epon resins of which several types, ranging from liquids to hard resins, can be obtained. Epoxy compounds of the polymeric or resinous type, which are complex mixtures of glycidyl ethers, generally have molecular weights in the range between about 250 and 10,000 and have the formula represented by $$\underset{CH_2}{\overset{O}{\diagdown}}\!\!-\!CH\!-\!CH_2\!-\!(-O\!-\!R\!-\!O\!-\!CH_2\!-\!CHOH\!-\!CH_2\!-)_n\!-\!O\!-\!R\!-\!O\!-\!CH_2\!-\!\underset{CH_2}{\overset{O}{\diagdown}}\!\!CH$$

where R represents the divalent hydrocarbon radical of a dihydric phenol and $n$ is an integer of the series 0, 1, 2, 3, etc. Suitable dihydric phenols include mononuclear phenols like resorcinol, catechol, hydroquinone, etc., or polynuclear phenols like bis-(4-hydroxyphenyl)-2,2-propane(bisphenol), 4,4'-dihydroxy benzophenone, bis(4-hydroxyphenyl)-1,1-ethane, bis-(4-hydroxyphenyl)-1,1-isobutane, bis-(4-hydroxyphenyl) - 2,2 - butane, bis-(4-hydroxy-2-methylphenyl) - 2,2 - propane, bis-(4-hydroxy-2-tertiary butyl phenyl)-2,2-propane, bis-(2-dihydroxynaphthyl)-methane, 1,5-dihydroxy naphthalene, etc.

The amount of epoxy compound employed as a plasticizer is generally in the range between 1 and 200 parts, preferably less than 100 parts by weight per 100 parts of the vinyl-substituted heterocyclic nitrogen base polymer, although larger amounts can be employed, if desired. The amount of epoxy compound used depends upon the epoxy compound itself, the nature of the polymer to be plasticized, and the type of product desired.

The heterocyclic nitrogen base polymers of the pyridine and quinoline series containing a vinyl or alpha-methylvinyl group used as starting materials in this invention include homopolymers and copolymers with materials copolymerizable therewith, such as conjugated dienes; styrene; various substituted styrenes, such as alkyl, alkoxy, and halogen-substituted styrenes; acrylonitrile; methacrylonitrile; methyl acrylate; methyl methacrylate; ethyl acrylate; butyl acrylate; and the like. Polymers prepared from various mixtures of heterocyclic nitrogen bases containing a vinyl or alpha-methylvinyl group with one or more other polymerizable materials are also applicable as well as terpolymers prepared from a heterocyclic nitrogen base containing a vinyl or alpha-methylvinyl group and two other types of monomers, e. g., a conjugated diene and a compound such as styrene, acrylonitrile, methyl acrylate, or the like. These polymeric starting materials can range from liquid to rubbery to solid resinous polymers depending upon the monomers employed and the method of preparation. For example, copolymers of conjugated dienes with a vinyl-substituted pyridine, when prepared by emulsion polymerization, can range from liquid to rubbery products having high Mooney (ML-4) values depending upon the amount of modifier employed in the polymerization recipe.

The nitrogen containing monomers suitable for use in our invention are those having the structure

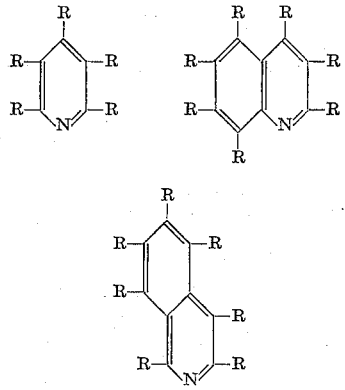

where R is selected from the group consisting of hydrogen, alkyl, vinyl, alpha-methylvinyl, nitro, alkoxy, halo, hydroxy, cyano, aryloxy, aryl, and combinations of these groups such as haloalkyl, alkylaryl, hydroxyaryl, and the like; at least one and not more than two of said groups being selected from the group consisting of vinyl and alpha-methylvinyl. It is preferred, in order to avoid steric hindrance, that the total number of carbon atoms in the substituted groups be not greater than 12. Examples of such compounds are 2-vinylpyridine; 2,5-divinylpyridine; 2-methyl-5-vinylpyridine; 2-vinyl-5-ethylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 3-dodecyl-4,5-divinylpyridine; 2,4-dimethyl-5,6-dipentyl-3-vinylpyridine; 2-decyl-5-(alpha-methylvinyl)pyridine; 3,5-di(alpha-methylvinyl)pyridine; 3-nitro-2-vinylpyridine; 2-vinyl-4-hydroxy-5-nitropyridine; 2-vinyl-3-methyl-5-ethylpyridine; 2-methoxy-4-chloro-6-vinylpyridine; 3-vinyl-5-ethoxypyridine; 2-vinyl-4-,5-dichloropyridine; 2-(alpha-methylvinyl)4-hydroxy-6-cyanopyridine; 2-vinyl-4-phenoxy-5-methylpyridine; 2-cyano-5-(alpha-methylvinyl)pyridine; 3-vinyl-5-phenylpyridine; 2-(para-methylphenyl)-3-vinyl-4-methylpyridine; 3-vinyl-5-(hydroxyphenyl)pyridine; 2-vinylquinoline; 2-vinyl-4-ethylquinoline; 3-vinyl-6,7-di-n-propylquinoline; 2-methyl-4-nonyl-6-vinylquinoline; 4(alpha-methylvinyl)-8-dodecylquinoline; 3-vinylisoquinoline; 1,6-dimethyl-3-vinylisoquinoline; 2-vinyl-4-benzylquinoline; 3 - vinyl - 5 - chloroethylquinoline; 3 - vinyl - 5,6 - dichloroisoquinoline; 2-vinyl-6-ethoxy-7-methylquinoline; 3-vinyl-6-hydroxymethylisoquinoline; etc.

The conjugated dienes employed are preferably those which contain from four to six inclusive, carbon atoms per molecule and include 1,3-butadiene, isoprene, piperylene, methylpentadiene, 2,3-dimethyl-1,3-butadiene, chloroprene and others. However, conjugated dienes having more than six, such as eight, carbon atoms per molecule can also be used. Furthermore, various alkoxy, such as methoxy and ethoxy, and cyano derivatives of these conjugated dienes are also applicable.

Polymers of the heterocyclic nitrogen bases herein described can be prepared by any method known to the art such as mass or emulsion polymerization and can range from liquid to rubbery to solid resinous polymers. For the preparation of these polymers the polymerizable nitrogen base component is generally in the range between 2 and 100 parts and the copolymerizable material is in the range between 98 and 0 parts by weight per 100 parts by weight of total monomeric material. The polymers should have a molecular weight of at least 300 and, preferably, at least 500 as determined by freezing point lowering in a suitable solvent.

Quaternizing agents which are suitable for use in preparing the quaternized polymers of the present invention include the various alkyl halides such as methyl iodide, methyl bromide, ethyl iodide, propyl iodide, hexyl iodide, nonyl bromide, cetyl bromide; the various alkylene halides such as ethylene iodide, ethylene bromide, propylene chloride, butene bromide, octene bromide; the various substituted alkanes and cycloalkanes necessarily including the above alkyl and alkylene halides, which contain at least one hydrogen atom attached to a carbon atom, such as bromoform, chloroform, 1,2-dichloropropane, 1,2-dibromobutane, ethylene chlorohydrin, acetyl chloride, iodoform, chloroacetyl chloride; alkyl sulfates such as methyl sulfate, ethyl sulfate, and the various substituted aromatic compounds such as picryl chloride, benzal chloride, benzotrichloride, methyl benzene sulfonate. Other materials which can be employed as quaternizing agents in the practice of this invention include the various polyhalogenated cycloalkenes such as hexachlorocyclopentadiene. The foregoing enumeration is not intended to include all the possible suitable quaternizing agents, but is only representative since many others may be used. Any organic compound which contains an active halogen atom attached to a carbon atom or contains a similar active quaternizing group and which is not an acid, is useful in our invention. In general, active quaternizing agents such as organic halides, organic sulfates, and organic acid chlorides and the like, which contain not more than 20 carbon atoms per molecule and contain at least one halogen or equivalent quaternizing group for example, an alkyl arylsulfonate, an aryl alkylhalide, an alkyl sulfate or the like, are satisfactory for the production of solid polymers from copolymers of a conjugated diene and a copolymerizable heterocyclic nitrogen base. Those compounds which contain the configuration

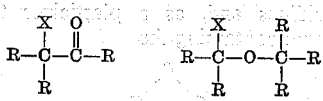

where X is a halogen atom such as chlorine, bromine and iodine and the R's represent oxygen, hydrogen or carbon valence linkages to their respective carbon atoms, are especially useful.

The reaction of a conjugated diene-heterocyclic nitrogen base copolymer with a quaternizing agent yields a product which contains characteristic nitrogen to carbon bonds in the recurring nitrogen base units of the polymers. In distinction, if the pyridine nucleus or portion of the copolymer were reacted with an acid acting substance (mineral acid, organic acid or the like) one of the two available nitrogen valences would be satisfied by a nitrogen to hydrogen bond and accordingly would not be a quaternized compound. The quaternary salts tend to be less water soluble than the unquaternized material whereas pyridinium salts formed by reaction with an acid acting compound (whereby a hydrogen atom attaches to a nitrogen atom) tend to be more water soluble. Furthermore, the quaternizing reaction is readily controlled since it proceeds rather slowly, the reaction with an acid being very rapid. Quaternary salts are distinguished over the other pyridinium or quinolinium salts in that they are derived from strong bases. Also pyridinium or quinolinium salts (other than a quaternary salt) form free pyridine or quinoline, water and a salt when reacted with a strong base. Therefore suitable quaternizing agents are those compounds which when reacted with the nitrogen atom of the heterocyclic base nucleus do not attach or link a hydrogen atom thereto. Expressed differently the quaternizing agents of this invention are those compounds X Y which react with the nitrogen atoms of the heterocyclic base nuclei of the copolymer or with a compound such as pyridine or quinoline to yield a material which may be characterized by the formulas

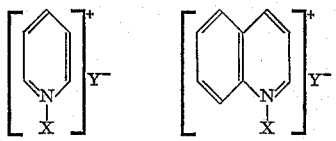

or

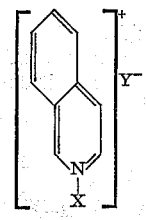

wherein X may be any molecular fragment, such as an organic radical, other than hydrogen and Y is the remaining molecular fragment such as an atom or radical (anion).

In our invention it is frequently preferred that the quaternizing agent be employed in an amount sufficient to effect substantially complete conversion of the pyridine and/or quinoline units of the polymer to the corresponding quaternary ammonium salt. If desired, however, more or less than the stoichiometric amount of the quaternizing agent can be used. For example, only about 20 to 50 percent of the required stoichiometric amount is considered sufficient in some cases while in other cases a 10 percent stoichiometric excess over the amount theoretically required is preferred.

When preparing the compositions of this invention, the quaternizing agent can be incorporated into the polymeric material and quaternization effected prior to adding the epoxy compound and other compounding ingredients or, if desired, the quaternizing agent can be incorporated into the polymeric material along with the epoxy compound and other compounding ingredients and the entire mixture cured at the temperature necessary to give the product desired. Curing is generally effected at a temperature in the range between 100 and 400° F., preferably between 150 and 350° F., for a period in the range between 5 minutes and 120 hours, preferably between 15 minutes and 50 hours. The temperature and time of curing will depend upon whether the polymer is quaternized prior to adding the other ingredients or whether the operation is performed in a single heating step. In cases where the quaternization reaction is carried out first, a much longer temperature can be employed than that specified.

Applicable in our invention are polymeric 2-hydroxy-alkyl quaternary salts, which represent a special type of quaternary ammonium salts of polymers of heterocyclic nitrogen bases of the pyridine and quinoline series containing a vinyl or alpha-methylvinyl group. These materials, which are more fully described in a copending application of Pritchard and Canterino, Serial No. 445,455, filed July 23, 1954, are prepared from polymeric vinyl-substituted heterocyclic nitrogen bases by treatment with an acid to form the pyridinium or quinolinium salt and then reacting the product with an epoxy compound whereby a polymeric 2-hydroxyalkyl quaternary salt is formed. The product can be isolated and then additional epoxy compound can be added, together with other compounding ingredients, and the mixture cured or, if desired, the total amount of epoxy compound can be added at one time, the mixture heated at a temperature in the range between 100 and 400° F., and the other compounding ingredients then incorporated and the stock cured. This application is also related to a copending application of Pritchard and Canterino, Serial No. 445,457, filed July 23, 1954, wherein epoxy compounds are reacted with polymers of vinyl-substituted heterocyclic nitrogen bases having alkyl groups in the 2 and/or 4 positions. Where the conditions of this last-mentioned application are met, the plasticizing action is a temporary one.

The products of this invention range from rubbery to hard resinous materials. They are much less susceptible to swelling when immersed in hydrocarbon solvents, than are the quaternized polymers in which no epoxy compound has been incorporated. They also show low extractability. Rubbery products show better swelling and about equal or better extractability characteristics than similar products in which a commercial plasticizer, such as dibutyl Carbitol formal, is used instead of an epoxy compound. Likewise, the tensile strength of these products is much higher than those in which a commercial plasticizer is used and the low temperature properties are good. They are particularly useful in applications, such as in gaskets, fuel tank linings, hose, and the like, which come in contact with solvent materials.

*Example*

An 85/15 butadiene/2-methyl-5-vinylpyridine copolymer, prepared by emulsion polymerization at 50° C. and having a Mooney value (ML-4) of 60, was compounded in accordance with the recipe given below using benzal chloride as the quaternizing agent and either styrene oxide or an Epon resin (Epon Adhesive VI), a complex mixture of glycidyl ethers, as the epoxy compound. This Epon resin is a material having ethylene oxide groups at the ends of a polymeric chain formed by the condensation of epichlorohydrin with bisphenol A (4,4'-isopropylidenediphenol), $HOC_6H_4C(CH_3)_2C_6H_4OH$. In some samples the commercial plasticizer, TP-90B (dibutyl Carbitol formal), was employed.

| | Parts by weight |
|---|---|
| Butadiene/2-methyl-5-vinylpyridine copolymer | 100 |
| Carbon black (Philblack A) | 60 |
| Zinc oxide | 3.0 |
| Sulfur | 1.5 |
| Altax [1] | 1.5 |
| Stearic acid | 1.5 |
| Benzal chloride | 0 or 20 |
| Epoxy compound | 0 or 20 |
| TP-90B | 0 or 20 |

[1] Benzothiazyl disulfide.

The compounded samples were cured 45 minutes at 307° F. and physical properties determined. Tests for swelling and extractability were made by immersing weighed samples in a mixture containing 60 percent diisobutylene and 40 percent aromatics (a mixture of benzene, toluene, and xylenes) at 158° F. for 48 hours. The volume percent swell was determined by noting the volume of a test specimen before and after immersion in the liquid hydrocarbon mixture. Extractability was determined by drying the sample at 158° F. for 48 hours and weighing it. From the difference in weight before and after immersion in the liquid hydrocarbon mixture, the extractability was calculated. Low temperature properties were determined by the low temperature retraction test. In this operation a test specimen of certain dimensions is elongated 50 percent, placed in a Dry Ice-acetone bath at −72° C. for 3 minutes, and then released. The bath is allowed to warm slowly and the temperature at which the samples retract certain predetermined lengths are recorded as T-R values. Results of the various tests on the different samples are shown in the following table:

| | | | | | | | |
|---|---|---|---|---|---|---|---|
| Benzal chloride [1] | 20 | | | | 20 | 20 | 20 |
| Epon adhesive VI [1] | | 20 | | | 20 | | |
| Styrene oxide [1] | | | 20 | | | 20 | |
| TP-90B [1] | | | | 20 | | | 20 |
| Tensile strength, p. s. i. | 2,950 | 2,110 | 1,880 | 1,860 | 2,260 | 2,435 | 1,420 |
| Elongation, percent | 315 | 290 | 285 | 420 | 205 | 245 | 255 |
| Swell, percent | 95 | 183 | 148 | 176 | 73 | 72 | 87 |
| Extractability, percent | 6 | 7 | 12 | 14 | 8 | 11 | 12 |
| Shore hardness | 82 | 75 | 69 | 59 | 83 | 77 | 68 |
| T-R data [2]: | | | | | | | |
| $T_1$ | 71 | 71 | 69 | | 70 | 69 | 70 |
| $T_3$ | 66 | 70 | 67 | | 60 | 60 | 65 |
| $T_5$ | 57 | 68 | 64 | | 50 | 52 | 62 |
| $T_{10}$ | 42 | 65 | 62 | 70 | 30 | 43 | 51 |
| $T_{20}$ | 29 | 59 | 58 | 66 | 26 | 34 | 43 |
| $T_{30}$ | 22 | 57 | 55 | 65 | 21 | 29 | 38 |
| $T_{40}$ | 19 | 54 | 53 | 62 | 18 | 24 | 35 |
| $T_{60}$ | 16 | 48 | 50 | 58 | 14 | 22 | 32 |

[1] Parts by weight per 100 parts rubber.
[2] ASTM D-599-40T.

As many possible embodiments can be made of this invention without departing from the scope thereof, it is to be understood that all matter herein set forth is to be interpreted as illustrative and not as unduly limiting the invention.

We claim:

1. As a composition of matter, a quaternized polymer of a heterocyclic nitrogen base containing at least one $CH_2=C<$ group and, as a plasticizer therefor, an epoxy compound containing the

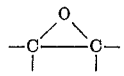

group having a molecular weight of at least 90, said epoxy compound having been added at a time subsequent to the polymerization and at a time not prior to the quaternization.

2. The composition of claim 1 in which the amount of said epoxy compound is in the range of from 1 to 60 parts by weight per 100 parts of said polymer.

3. The composition of claim 1 in which said epoxy compound is an epoxy resin having a molecular weight in the range of from 250 to 10,000.

4. The composition of claim 1 in which said epoxy compound is styrene oxide.

5. As a composition of matter, a quaternized copolymer of a conjugated diene and a material selected from the group consisting of monovinylpyridines and alkyl monovinylpyridines and, as a plasticizer therefor, an epoxy compound containing the

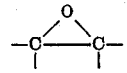

group having a molecular weight of at least 90, said epoxy compound having been added at a time subsequent to the polymerization and at a time not prior to the quaternization.

6. The composition of claim 5 in which the amount of said epoxy compound is in the range of from 1 to 60 parts by weight per 100 parts of said polymer.

7. As a composition of matter, a quaternized copolymer of butadiene and 2-methyl-5-vinylpyridine, said vinylpyridine comprising at least 2 percent by weight of the monomeric mixture used in preparing said polymer and, as a plasticizer therefor, an epoxy compound containing the

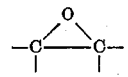

group having a molecular weight of at least 90, said epoxy compound having been added at a time subsequent to the polymerization and at a time not prior to the quaternization.

8. The composition of claim 7 in which said epoxy compound is an epoxy resin having a molecular weight of from 250 to 10,000.

9. The composition of claim 7 in which said epoxy compound is styrene oxide.

10. As a composition of matter, a quaternized polymer of a tertiary heterocyclic nitrogen base selected from the group consisting of

and

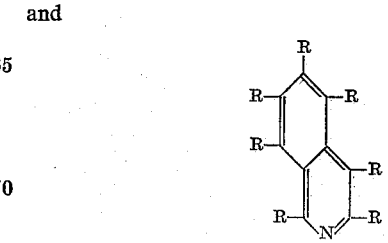

where R is selected from the group consisting of hydrogen, alkyl, vinyl, alpha-methylvinyl, nitro, alkoxy, halo, hydroxy, cyano, aryloxy, aryl, at least one and not more than 2 said groups being selected from the group consisting of vinyl and alpha-methylvinyl, and as a plasticizer therefor, an epoxy compound containing the

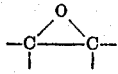

group having a molecular weight of at least 90, said epoxy compound having been added at a time subsequent to the polymerization and at a time not prior to the quaternization.

References Cited in the file of this patent
UNITED STATES PATENTS

| | | |
|---|---|---|
| 2,650,151 | Ham | Aug. 25, 1953 |
| 2,676,952 | Ham | Apr. 27, 1954 |